Feb. 9, 1943.    G. F. STRONG    2,310,557
ELECTRIC SEAM WELDING MACHINE
Filed April 11, 1941    3 Sheets-Sheet 1

Inventor
George F. Strong
By
J. S. Murray
Attorney

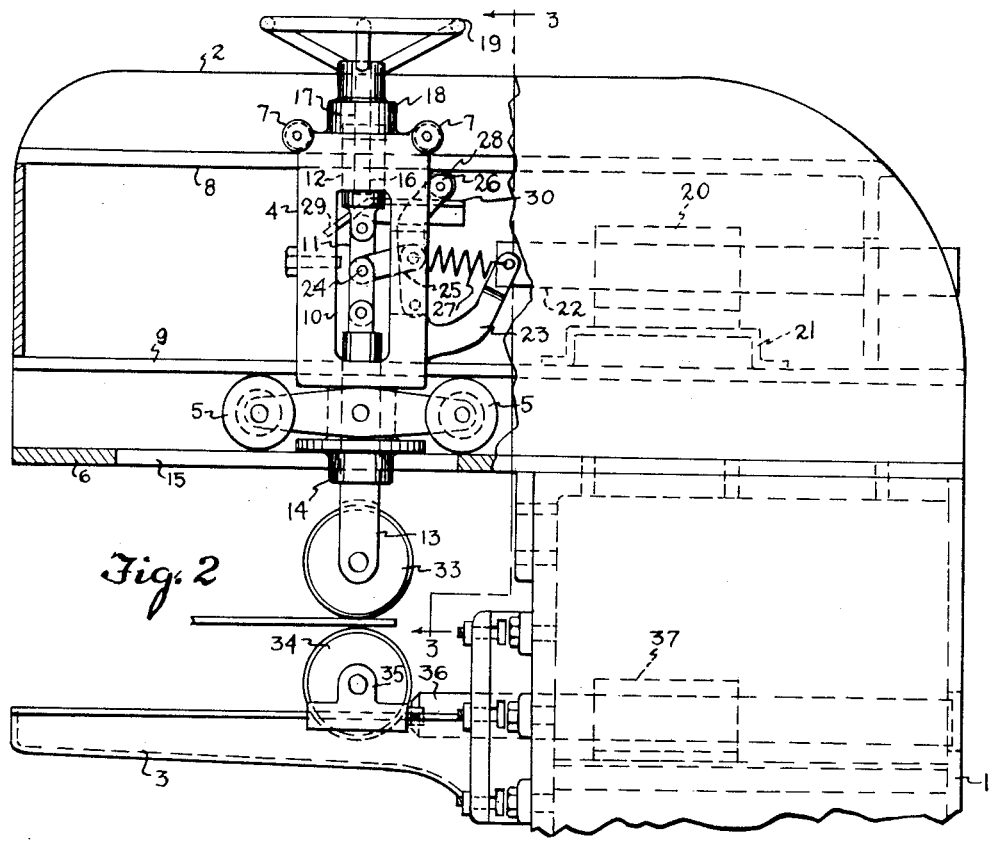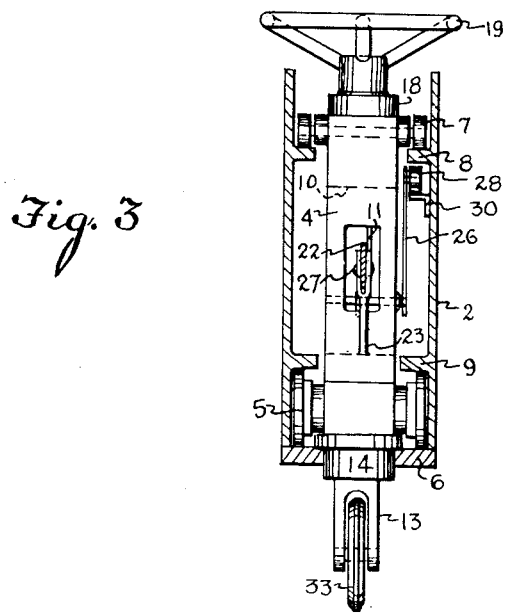

Feb. 9, 1943. G. F. STRONG 2,310,557
ELECTRIC SEAM WELDING MACHINE
Filed April 11, 1941 3 Sheets-Sheet 3
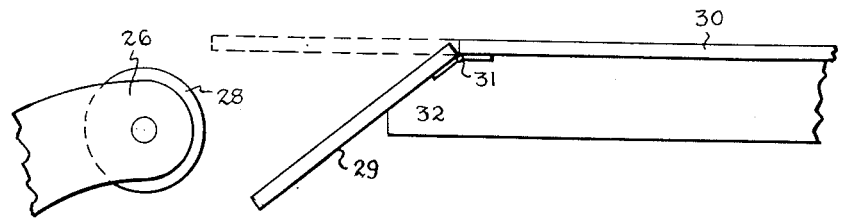
Fig. 4
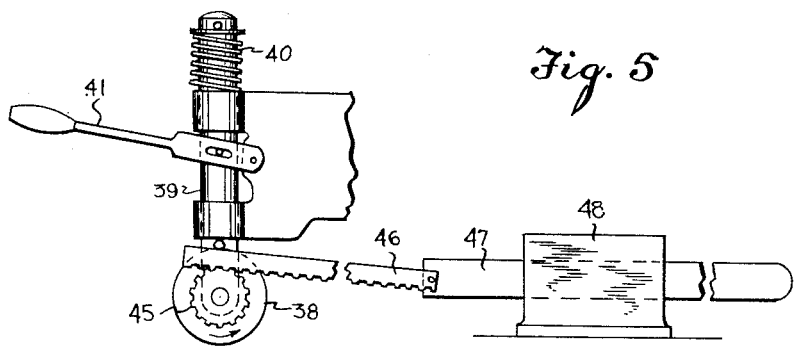
Fig. 5
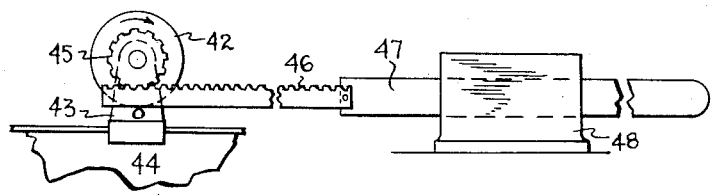
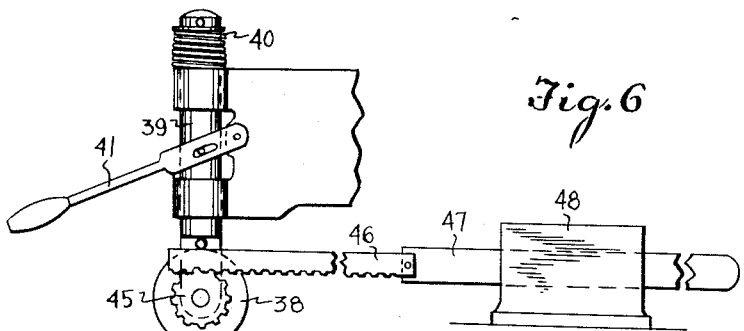
Fig. 6
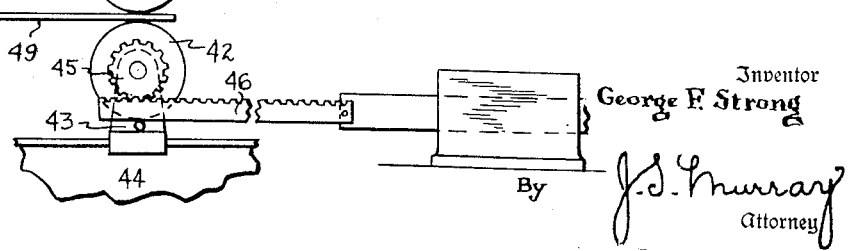
Inventor
George F. Strong
By J. S. Murray
Attorney Patented Feb. 9, 1943

2,310,557

UNITED STATES PATENT OFFICE 2,310,557

ELECTRIC SEAM WELDING MACHINE

George F. Strong, Grosse Pointe Farms, Mich.

Application April 11, 1941, Serial No. 388,052

8 Claims. (Cl. 219—4)

This invention relates to electric welding and particularly to electric seam welding machines.

An object of the invention is to provide a common means for actuating one of a pair of seaming electrodes to and from the companion electrode to engage or disengage the work and for reciprocating the electrodes in unison along a seam.

Another object is to directly apply electrical energy to effect reciprocation of an electrode for seam welding purposes.

Another object is to independently motivate a pair of electrodes for seam welding travel and maintain their complete synchronism in such travel.

Another object is to mount an electrode on a carriage for seam welding travel with the carriage and for actuation relative to the carriage to and from the work, and to provide cam means for maintaining the work-engaging position of the electrode during a predetermined portion of the carriage travel.

These and various other objects are attained by the construction hereinafter described and illustrated in the accompanying drawings, wherein:

Fig. 2 is a similar view of the upper portion of the machine, showing a welding position of the mechanism.

Fig. 3 is a cross sectional view, taken on the line 3—3 of Fig. 2.

Fig. 4 is a view of a roller and its track or runway as they appear in Fig. 2, but drawn to a larger scale.

Fig. 5 is a view in side elevation of an alternative construction, shown somewhat diagrammatically, the illustrated disk electrodes being in idle position.

Fig. 6 is a similar view showing the welding position of the electrodes.

Figure 1:
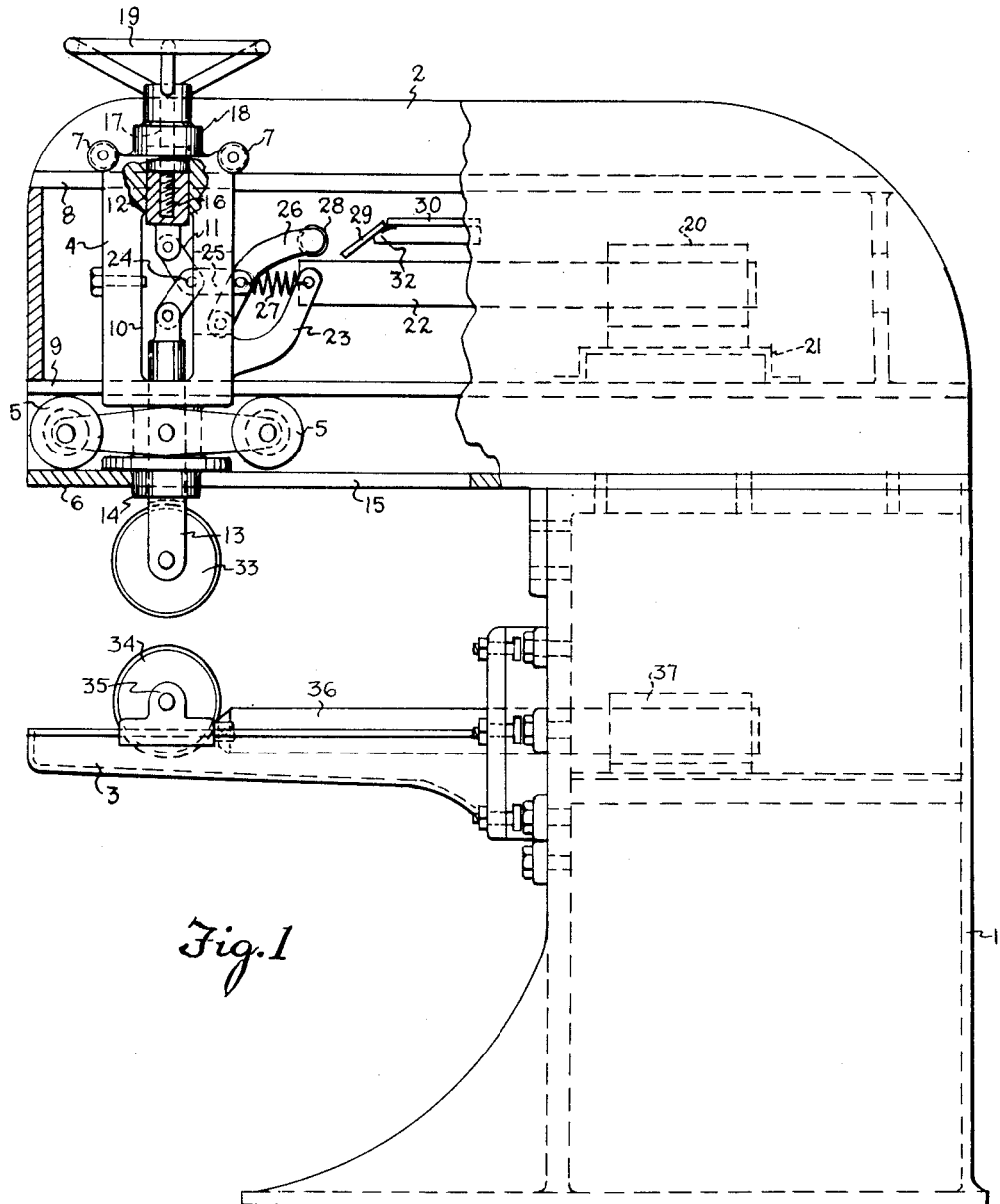
Fig. 1 is a view in side elevation of the machine, with certain parts broken away, and showing an idle position of the mechanism.

In these views, the reference character 1 designates a hollow frame having a forwardly projecting top portion 2 and carrying a forwardly projecting bracket 3, downwardly spaced from the portion 2. As will presently appear, the bracket 3 functions as a work support.

Mounted within the portoin 2 for forward and back travel is a carriage 4, equipped with lower wheels 5 traveling on the floor 6 of said portion, and with upper wheels 7 traveling on horizontal ribs 8 projecting interiorly from the walls of said portion. Said walls are further formed with opposed horizontal ribs 9, engaging above the wheels 5 and thus resisting any upthrust exerted on the carriage. The carriage is formed in its mid portion with a vertically elongated opening 10, accommodating a pair of toggle links 11, which interconnect a cylindrical head 12 and a plunger 13, axial aligned and vertically slidable respectively in the top and bottom portions of the carriage. The carriage is formed with a slide bearing 14 for the plunger 13, said bearing projecting downwardly through a slot 15, rearwardly elongated in the floor 6. Axially engage1 in the head 12 is an adjusting screw 16 formed by the lower end portion of a vertical shaft 17 journaled in a bearing 18 upstanding from the carriage 4 and engaged by an actuating hand wheel 19 above said bearing.

For actuating the carriage 4, the field coil box 20 of a recipromotor is mounted in the rear top portion of the frame upon a plate 21 bridging the ribs 9, and the slide bar 22 of said motor is connected at its front end to an arm 23 projecting rigidly upwardly and rearwardly from the carriage. The term "recipromotor" applies to a commercially available motor employing the energy of field coils (not shown) to inductively or electromagnetically effect rectilinear travel of an elongated bar.

From the pivotal interconnection 24 of the toggle links, a link 25 extends to the mid portion of a lever 26, fulcrumed on the lower rear portion of the carriage and projecting upwardly, with a normal rearward inclination. A coiled spring 27 extending from said lever to arm 23 tends to normally maintain the disaligned position of the toggle links shown in Fig. 1 and thus tends to hold the plunger 13 raised. A roller 28 journaled on the upper end of said lever is adapted, during initial rearward travel of the carriage, to encounter a gradually inclined ramp 29 and to ride up such ramp to a horizontal track 30, traveling on the latter until the carriage has almost completed its rearward travel. As the carriage reaches its rear limit, the roller rides off the track 30, and is swung down by the lever 26, responsive to the spring 27, so that it may travel under the track when the carriage moves forwardly. As the carriage approaches its forward limit, the roller rides under the ramp 29, momentarily swinging the latter up to its dash line position shown in Fig. 4. To afford the ramp a required up-and-down swinging movement, its rear end is hinged to the front end of the track, as indicated at 31. As the carriage reaches it forward limiting position, the roller 28 travels clear of the ramp, and the weight of the latter returns it to its normal lowered position, resting on a tongue 32 forwardly projecting from the track 30.

It will be noted that travel of the roller 28 up the ramp entails a forward swinging of the lever 26 and such swinging exerts pressure through link 25 on the toggle links to establish their aligned position, shown in Fig. 2, thereby lowering the plunger 13.

Below the projection 2 of the frame, the plunger 13 rotatively mounts a disk electrode 33, and an underlying companion disk electrode 34 is journaled in a bearing 35 slidable forwardly and back on the bracket 3. For actuating the electrode 34 in unison with the overlying electrode, a reciprocmotor slide bar 36 is attached to and extends rearwardly from the bearing 35, and the field coil box 37 for the bar 36 is fixedly mounted within the frame 1, preferably in exact vertical registration with the field coil box 20. With such an arrangement, when the two reciprocmotors are energized in unison, the bars 22 and 36 are actuated in exact correspondence, so that the proper opposed relation of the two electrodes is maintained in all positions of their forward and back travel. During such travel, one or more pieces of work interposed between the electrodes will be firmly engaged by the latter, the lower electrode transmitting the work load to the supporting bracket 3.

In the modified construction shown in Figs. 5 and 6, an upper disk electrode 38 is journaled on the lower end of a plunger 39 normally raised by a coiled spring 40 and adapted to be lowered, under considerable pressure, by a manually actuable lever 41. A companion disk electrode 42, normally downwardly spaced from the electrode 38, is journaled in a bearing 43 carried by any suitable support 44. Coaxial with each electrode and in driving engagement therewith is a pinion 45 and a pair of rack bars 46, normally meshed at their forward ends with the pinions 45, are pivoted at their rear ends to the slide bars 47 of two similar reciprocmotors, whereof the field coil boxes are designated at 48.

As the upper electrode is actuated from its raised idle position shown in Fig. 5 to its lower working position shown in Fig. 6, the upper rack bar maintains its engagement with the corresponding pinion 45 by swinging about the pivotal rear end of said bar.

In forming a welded seam, the work 49 is fed rearwardly between the electrodes, the two reciprocmotors being at the same time energized to drive the rack bars forwardly and thus rotatively drive the pinions 45 and electrodes in directions urging the work rearwardly.

In either of its described forms, the invention provides for rapid seam welding, under a pressure constant for any certain job, but regulable, when necessary, to suit various jobs. The electrodes may be quickly accommodated to different thicknesses of work and the extreme simplicity of the actuating mechanism reduces the manufacturing cost, as compared to that of prior seam welding machines.

Reciprocmotors, as employed in the described invention to drive the electrodes along a seam, particularly lend themselves to such a function, being compact, capable of exerting a powerful thrust or pull, being easily regulable to increase or diminish such thrust, and being readily reversible so as to drive the electrodes either forward or back.

What I claim is:

1. In an electric welding machine, a carriage, a work support, means for guiding the carriage in travel along the work support, an electrode movable on the carriage to and from the work support, means for shifting the carriage along its guide means, and a mechanism actuable by said shifting means for moving the electrode toward the work support.

2. In an electric welding machine as set forth in claim 1, a spring on the carriage normally retracting the electrode from the work support.

3. In an electric welding machine, a carriage, a work support, means for guiding the carriage in travel along the work support, an electrode movable on the carriage to and from the work support, a lever pivoted on the carriage, means for moving the electrode to and from the work support, responsive to said lever, and means fixed in the path of the carriage coacting with said lever to maintain a work-engaging position of the electrode during a predetermined portion of the carriage travel.

4. In an electric welding machine as set forth in claim 3, a roller journaled on said lever, a track receiving said roller during a predetermined portion of the carriage travel and maintaining the lever in a position to apply the electrode to the work during such travel, and a ramp for guiding the roller into engagement with the track.

5. In an electric welding machine, a carriage, a work support, means for guiding the carriage in travel along the work support, an electrode movable on the carriage to and from the work support, a motor for shifting the carriage along its guide means, an actuating connection from the motor to the carriage including an arm fixed on the carriage, a lever pivoted on the carriage, means for moving the electrode to and from the work support responsive to said lever, a spring interconnecting said lever and arm for normally retracting the electrode, and means fixed in the path of the carriage coacting with said lever to maintain the work-engaging position of the electrode during a predetermined portion of the carriage travel.

6. In an electric welding machine, a carriage, a work support, means for guiding the carriage in travel along the work support, an electrode holder movable on the carriage to and from the work support, a pair of toggle links connecting the electrode holder to the carriage and movable into approximate alignment with the electrode holder to establish a work-engaging position of the electrode, a lever pivoted on the carriage for actuating said toggle links, and means fixed in the path of the carriage coacting with the lever to maintain a work-engaging position of the electrode during a predetermined portion of the carriage travel.

7. In an electric welding machine, a carriage, a work support, means for guiding the carriage in travel along said support, an electrode movable on the carriage to and from said support, means for shifting the carriage along its guide means, mechanism on the carriage for actuating the electrode, and an element disposed in the path on the carriage and engageable by an element of said mechanism, responsive to travel of the carriage to actuate said mechanism.

8. In an electric welding machine, a carriage, a work support, means for guiding the carriage in travel along said support, an electrode movable on the carriage between a raised and a lowered position, a spring urging the electrode to one of said positions, mechanism on the carriage for shifting the electrode to its other position, and means in the path of the carriage coacting with said mechanism to actuate it during a predetermined portion of the carriage travel.

GEORGE F. STRONG.